Dec. 18, 1951 S. J. MARTIN 2,578,714

SOUND AND FACSIMILE MULTIPLEX SYSTEM

Filed Sept. 18, 1947 2 SHEETS--SHEET 1

STEPHEN J. MARTIN
INVENTOR

BY Alfred W. Barber
ATTORNEY

STEPHEN J. MARTIN
INVENTOR.
BY Alfred W. Barber
ATTORNEY.

Patented Dec. 18, 1951

2,578,714

UNITED STATES PATENT OFFICE 2,578,714

SOUND AND FACSIMILE MULTIPLEX SYSTEM

Stephen J. Martin, Long Island City, N. Y., assignor to Faximile, Inc., New York, N. Y., a corporation of Delaware Application September 18, 1947, Serial No. 774,705

2 Claims. (Cl. 178—5.6)

The present invention concerns the multiplex transmission of two different signals and in particular the multiplex transmission of sound and facsimile signals over a frequency modulation channel.

The primary object of the present invention is to utilize a frequency modulation sound channel of conventional characteristics and to add other signals to the carrier without in any way interfering with the normal operation of the sound channel.

A further object of the present invention is to add facsimile signals to a channel normally carrying frequency-modulated sound signals in such a way that no cross modulation or interference is produced by the facsimile signals in a sound receiver of conventional and existing designs.

A still further object of the present invention is to add facsimile transmission to a conventional frequency modulation sound transmission without in any way detracting from the normal transmission of the sound program.

An additional object of the present invention is to multiplex sound and facsimile signals on a frequency modulation channel in such a way that the sound signals may be utilized by a receiver adapted to the reception of sound signals only, without interference from facsimile signals, but permitting the reception of both sound and facsimile signals in a receiver adapted to utilize both signals to their fullest extent.

These and other objects of the present invention will be apparent from the description of the various figures of the drawings.

In the past a number of systems have been suggested or utilized for the multiplex transmission of sound and facsimile signals. These systems, in general reduce the efficiency of the sound transmission and require special circuits or modification to the sound receiver to eliminate cross modulation or interference by the facsimile signals. In addition, these systems generally require a wider transmission band than normally required for the sound transmission alone. These systems are undesirable since they would cause interference in existing frequency modulation sound receivers or would expand the channel width required for the transmission. The present invention represents a great improvement over any previously utilized or proposed system, in that the facsimile signals may be multiplexed on existing frequency modulation sound channels without causing interference in a normal conventional frequency modulation sound receiver and without appreciably increasing the required band width or channel for the multiplex operation.

Briefly, in the present multiplex system according to the present invention the sound signals are transmitted in the conventional manner and the facsimile signals are utilized to frequency modulate a superaudible sub-carrier which in turn is utilized to amplitude modulate the radio frequency carrier of the sound channel.

As used herein, the term "sound signals" may include the audible frequency spectrum of 30 to 15,000 cycles per second; and the term "facsimile signals" may be taken to include the usual audible frequency spectrum required for high definition facsimile, e. g., the range of zero to approximately 3,000 cycles per second.

According to the present invention sound signals are utilized in the conventional manner to frequency modulate a high frequency carrier to a maximum deviation on the order of ± 75 kilocycles, and the facsimile signals are utilized and transmitted by first frequency modulating a superaudible sub-carrier of the order of 40 kilocycles and in turn utilizing this frequency modulated superaudible sub-carrier to amplitude modulate the sound frequency modulated high frequency carrier to a moderate amplitude of the order of 30%. The sound and facsimile signals thus combined are transmitted and received at a distant point on a receiver which first selects and amplifies the combined signals, removes the facsimile amplitude modulation from the combined signal, utilizes the facsimile signals in appropriate channels, and utilizes the sound signals in another suitable channel.

Figure 1:
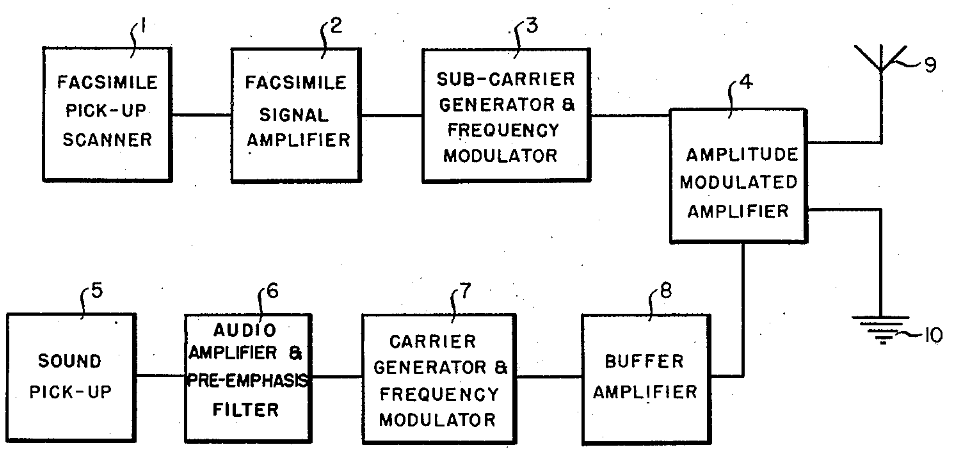
Fig. 1 shows a preferred form of the present invention in block diagram for the transmitter.

The generation, modulation, and combining of the facsimile and sound signals and their transmissions may be accomplished, for example, by means of a system as shown in block diagram in Fig. 1. In Fig. 1 facsimile signals are picked up in a conventional manner from a conventional scanner as represented by block 1. These facsimile signals are amplified in a conventional manner by the facsimile signal amplifier 2. These amplified facsimile signals are utilized to frequency modulate, to a deviation of the order of five or ten kilocycles, a superaudible frequency sub-carrier of the order of forty kilocycles in the sub-carrier generator and frequency modulator 3. Sound signals are generated or picked up in the conventional manner by a sound pick up 5. The sound signals are amplified in a conventional manner by an audio amplifier 6. A high frequency carrier of 90 megacycles, for example, is frequency modulated to a standard deviation of a maximum of the order of ± 75 kilocycles by the sound signals in the carrier generator and frequency modulator 7. The frequency modulated sound signals are amplified in buffer amplifier 8. The frequency modulated sound signals are passed on to an amplitude modulated amplifier 4, where the frequency modulated superaudible sub-carrier carrying the facsimile signals is superimposed as an amplitude modulation with a nominal amplitude of the order of 30% maximum. The combined signals are then radiated over a conventional antenna and ground system such as 9 and 10. Thus, it will be seen that this system according to the present invention, provides a conventional frequency modulated sound transmission and that the facsimile signals are added without materially increasing the transmission band or restricting the deviation utilized by the sound channel.

Figure 2:
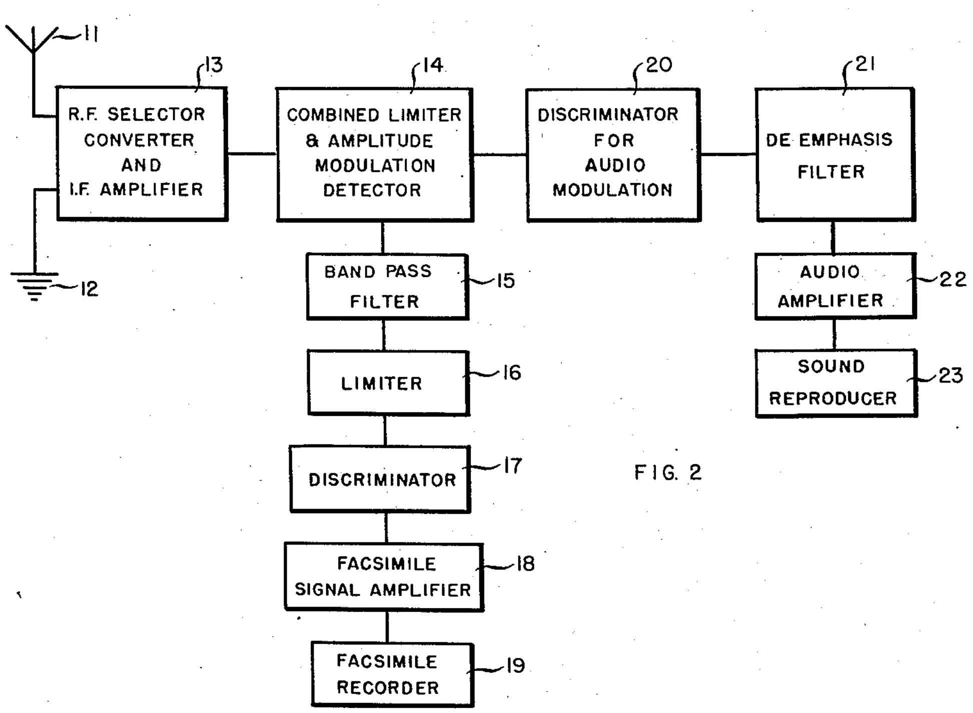
Fig. 2 shows a preferred form of the present invention in block form for the receiver.

In the receiver for the multiplex sound and facsimile signals the combined signals are passed through a selector, converter and intermediate frequency amplifier, and separated into their sound and facsimile components, and are separately utilized by appropriate means. This may be accomplished according to the present invention, for example, by the apparatus shown in block diagram in Fig. 2. The combined signals are received on an antenna and ground system 11 and 12, are selected, converted and amplified in the R. F. selector converter and I. F. amplifier 13 and passed on to a combined limiter and amplitude modulation detector 14. The limiter and amplitude modulation detector 14 removes the facsimile amplitude modulation signals from the combined signal and the limited sound signals are passed on to a discriminator 20 while the amplitude modulated sub-carrier, frequency modulated by the facsimile signals, is passed to a band pass filter 15 which removes any of the unwanted lower frequency sound components from the superaudible sub-carrier. The facsimile signal, now comprising a frequency modulated superaudible sub-carrier, is passed through a conventional limiter 16 and a discriminator 17 producing demodulated facsimile signals. The facsimile signals are amplified in a facsimile signal amplifier 18 and are passed to a conventional facsimile recorder 19 where they are recorded upon a recording sheet. The sound signals after the removal of the facsimile signals are passed through a conventional frequency modulation discriminator 20 and a conventional de-emphasis filter 21 resulting in interference-free sound signals representing the original sound. These sound signals are amplified in a conventional audio amplifier 22 and utilized in appropriate sound reproducer 23. Thus, according to the present invention, the sound signals are received and reproduced without restriction or interference from the facsimile signals and the facsimile signals are separated and utilized without interference from the sound signals.

Figure 3:
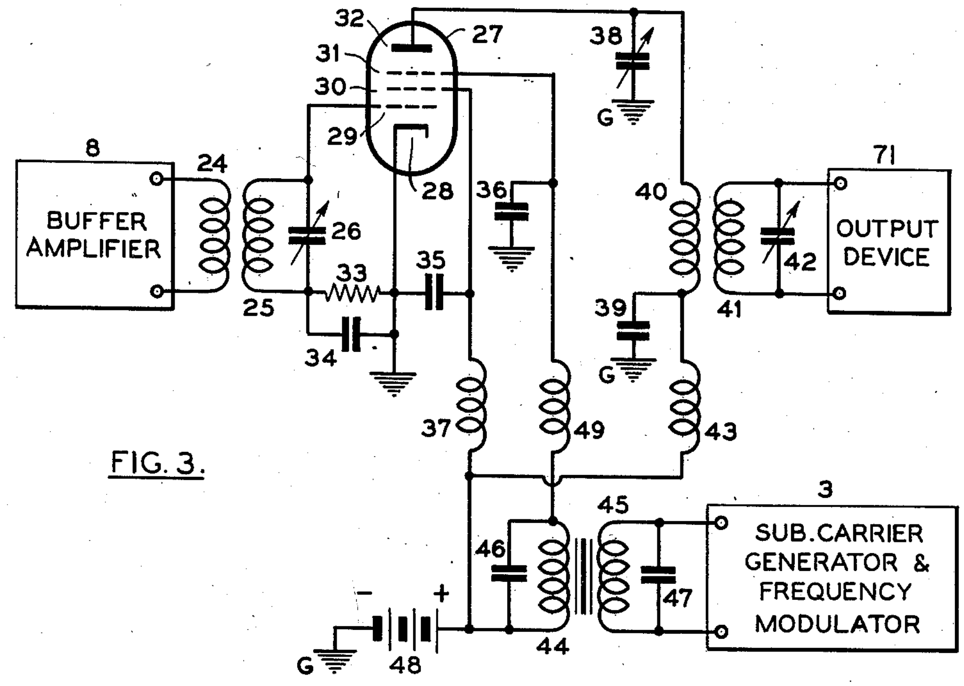
Fig. 3 shows details of one portion of the transmitter of Fig. 1.

Fig. 3 shows details of one form of "Amplitude Modulated Amplifier" as shown at 4 in Fig. 1. The high frequency carrier frequency modulated by sound signals is received from buffer amplifier 8 across primary 24 of tuned transformer 24—25. Secondary 25 is tuned by condenser 26. The modulated signals appearing across secondary 25 are applied across grid 29 and cathode 28 of modulator tube 27 through bias resistor 33 shunted by condenser 34. Tube 27 may be any suitable modulator tube such as a pentode, as shown, having cathode 28 heated by conventional means not shown, control grid 29, screen grid 30, suppressor grid 31 and plate 32. Plate and screen voltages may be supplied from any convenient source such as battery 48. The amplitude modulation of the sound frequency modulated signals, applied to the control grid 29, by the facsimile frequency modulated sub-carrier from 3 may be carried out in tube 27 in any convenient manner as by applying the facsimile modulated sub-carrier from 3 to grid 31 by means of coupling transformer 44—45. The resulting complex signal consisting of the sound frequency modulated high frequency carrier, in turn amplitude modulated by the facsimile frequency modulated sub-carrier, is taken off through transformer 40—41 connected to plate 32 of tube 27. This complex signal may be utilized in any desired manner, the output device 71 being taken to represent any desired utilization means such as an antenna system for radiating the signal to a distant point. The details shown in Fig. 3 are not to be taken as limitations to the practice of the invention but to illustrate one way in which the desired result may be accomplished.

Figure 4:
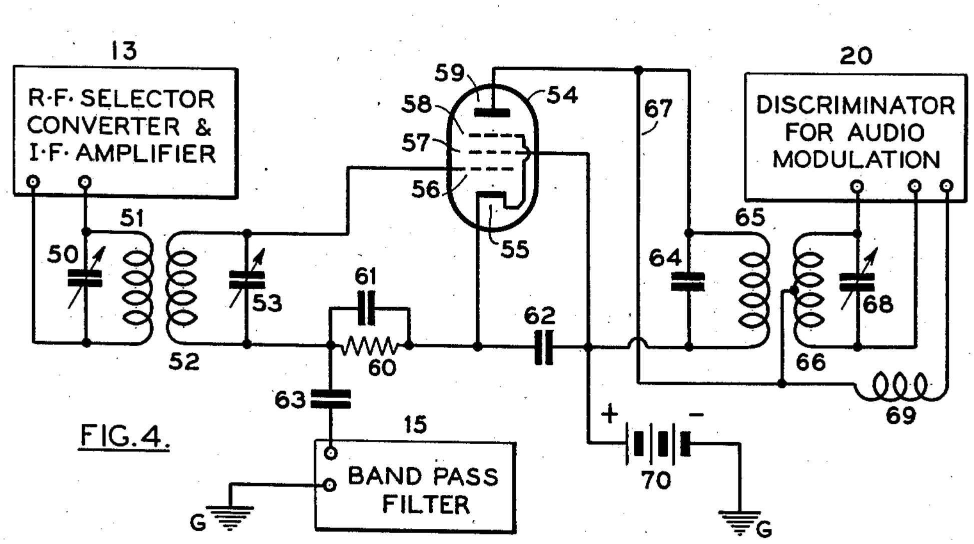
Fig. 4 shows details of one portion of the receiver of Fig. 2.

Fig. 4 shows details of one form of the combined limiter and amplitude modulation detector 14 of Fig. 1 in order to illustrate one way in which the present invention may be carried out. Any convenient detector tube such as a pentode 54 may be used. Pentode 54 includes cathode 55 heated by conventional means not shown, control grid 56, screen grid 57, suppressor grid 58 and plate 59. Signals from R. F. selector, converter and I. F. amplifier 13 are applied to primary 51 of tuned transformer 50—51—52—53. The secondary 52 is connected to grid 56 and to cathode 55 through grid resistor 60 shunted by condenser 61. Tube 54 having no bias except that generated by grid current flowing in resistor 60 acts as a limiter and removes the facsimile amplitude modulated subcarrier from the signal. The limited signal consisting of sound frequency modulated signals is applied to discriminator input transformer 65—66 from which it goes to discriminator 20 as described above. The grid current flowing in resistor 60 will vary in accordance with the facsimile amplitude modulations and a voltage representing the facsimile amplitude modulation, which in turn comprises the facsimile frequency modulated superaudible subcarrier, appears across resistor 60 from which it is applied to band pass filter 15 as described above. It will be seen that this circuit functions to separate the sound and facsimile signals after which each appears without interference from the other.

With this type of transmission it will be seen that the facsimile and sound signals are multiplexed without impairing or interfering with the normal transmission and reception of the sound signals and without materially increasing the frequency band required, or decreasing the deviation applied to the sound signal channel. It will also be seen that, if the multiplex signals are received on a conventional frequency modulation sound receiver, the facsimile signals are largely or entirely removed in the conventional limiter stage and that any slight residual, due to its high frequency characteristics, will be inaudible. Thus, the conventional receiver functions without interference from the facsimile signals, and no changes are required in the circuits of the sound receiver. It will also be seen that, due to the high frequency sub-carrier and the relatively low percentage of modulation utilized by the facsimile signals, little if any increase in power is required in the final amplifiers of the transmitter to transmit the multiplex signal. The use of high frequency amplitude modulation requires only a very low powered, inexpensive modulator.

While a single embodiment of the present invention has been shown and described many modifications will be apparent to those skilled in the art and within the spirit and scope of the appended claims.

What is claimed is:

1. In a system for multiplex signals including a range of frequency components covering essentially the audible spectrum of 30 to 15,000 cycles per second and a signal spectrum substantially less than said audible spectrum, the combination of, a source of signals covering substantially said audible spectrum, means for amplifying said signals, a high frequency carrier signal generator, means for frequency modulating said carrier generator with signals from said amplifying means, a source of signals comprising said second spectrum, an amplifier for amplifying said last said signals, a sub-carrier generator, means for frequency modulating said sub-carrier with signals from said last said amplifier, means for amplitude modulating said frequency modulated high frequency carrier with said frequency modulated sub-carrier, and means for radiating said last modulated signal.

2. A system for multiplexing two signals in the audible frequency range, the first of said signals representing sound, and the second representing facsimile, comprising in combination, a first source of signals in the audible range, a radio frequency carrier generator, a first frequency modulator for frequency modulating the output of said generator with signals from said first source, a second source of signals in the audible range, a superaudible sub-carrier generator, a second frequency modulator for frequency modulating the output of said sub-carrier generator with the signal from said second source, and an amplitude modulator for amplitude modulating the radio frequency output of said first modulator with the superaudible output of said second modulator.

STEPHEN J. MARTIN.

REFERENCES CITED

The following references are of record in the file of this patent:

UNITED STATES PATENTS

| Number | Name | Date |
|---|---|---|
| 1,740,859 | Hammond | Dec. 24, 1929 |
| 2,275,540 | Mattke | Mar. 10, 1942 |
| 2,289,157 | Whitaker | July 7, 1942 |
| 2,301,504 | Batchelor | Nov. 10, 1942 |
| 2,326,740 | Artzt | Aug. 17, 1943 |
| 2,403,385 | Loughlin | July 2, 1946 |
| 2,435,736 | Carnahan | Feb. 10, 1948 |

OTHER REFERENCES

RCA Review, October 1939, pages 135 to 152.

RCA Review, July 1941, pages 88 to 101.